United States Patent
Byers

(10) Patent No.: US 6,975,594 B1
(45) Date of Patent: Dec. 13, 2005

(54) SYSTEM AND METHOD FOR PROVIDING CONTROLLED BROADBAND ACCESS BANDWIDTH

(75) Inventor: Charles Calvin Byers, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 850 days.

(21) Appl. No.: 09/604,152

(22) Filed: Jun. 27, 2000

(51) Int. Cl.[7] .................................... G01R 31/08
(52) U.S. Cl. ............... 370/238; 370/238.1; 370/395.21
(58) Field of Search ................. 370/230, 233, 370/234, 235, 252, 253, 395.21, 395.41, 370/395.43, 437, 465, 468, 231, 232, 238, 370/238.1, 395.2, 395.42, 395.52

(56) References Cited

U.S. PATENT DOCUMENTS

| | | | |
|---|---|---|---|
| 5,673,393 A | * | 9/1997 | Marshall et al. ............. 709/226 |
| 5,848,266 A | * | 12/1998 | Scheurich ................... 713/503 |
| 6,097,722 A | * | 8/2000 | Graham et al. ......... 370/395.21 |
| 6,108,304 A | * | 8/2000 | Abe et al. .................... 370/232 |
| 6,396,816 B1 | * | 5/2002 | Astle et al. .................. 370/264 |
| 6,404,738 B1 | * | 6/2002 | Reininger et al. .......... 370/236 |
| 6,578,077 B1 | * | 6/2003 | Rakoshitz et al. .......... 709/224 |
| 6,657,964 B1 | * | 12/2003 | Kohzuki et al. ......... 370/236.1 |
| 6,690,678 B1 | * | 2/2004 | Basso et al. ................ 370/468 |
| 6,735,176 B1 | * | 5/2004 | So ............................. 370/237 |

* cited by examiner

Primary Examiner—Phirin Sam

(57) ABSTRACT

A system and method for providing controlled broadband access bandwidth allocation adjustment service are disclosed. A broadband bandwidth allocation service manager is established which is accessible via the broadband network. When a broadband bandwidth allocation adjustment request is received from a requestor, a broadband bandwidth allocation adjustment will be made if the requested bandwidth is available and the requester is willing to accept the pricing associated with the adjustment.

61 Claims, 6 Drawing Sheets

SYSTEM AND METHOD FOR PROVIDING CONTROLLED BROADBAND ACCESS BANDWIDTH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to broadband data networks. More particularly, the invention concerns the control of broadband access bandwidth provided to broadband network subscribers.

2. Description of the Prior Art

In a broadband (e.g., ATM (Asynchronous Transfer Mode) data network, the upstream and downstream traffic bandwidth provided to network subscribers is generally fixed. Bandwidth allocation also tends to be group-based due to the manner in which subscriber access is concentrated at the broadband network access interface (i.e., many subscribers share a single feeder link to the broadband network). Some broadband networks do allow bandwidth variations, but the same bandwidth limits typically apply to all members of a particular service class, and cannot be controlled with fine granularity or adjusted by any one subscriber.

Often, a special need arises in which a subscriber would benefit from a temporary increase in available bandwidth. Examples of this include conducting a multi-media presentation, engaging in extensive online research, publishing lengthy documents, downloading large files, performing high resolution video transport, and other bandwidth-intensive activities. Under existing broadband network access arrangements, providing such increased bandwidth for limited time periods is not feasible. The bandwidth that a subscriber receives remains the same unless and until the subscriber's service arrangement is modified. Due to the administrative and accounting complexities involved in such changes, broadband network bandwidth normally remains relatively static for any given subscriber.

SUMMARY OF THE INVENTION

The foregoing problem is solved and an advance in the art is obtained by a novel system and method for providing controlled broadband access bandwidth on a per-subscriber basis. In accordance with the invention, a broadband bandwidth allocation service manager is established which is accessible via the broadband network. When a broadband bandwidth allocation adjustment request is received from a requestor, a broadband bandwidth allocation adjustment will be made if the requested bandwidth is available.

In preferred embodiments of the invention, broadband bandwidth allocation pricing is periodically established based on current broadband bandwidth demand and availability factors, and the allocation adjustment is conditioned on acceptance of the bandwidth allocation pricing by the requestor. Price establishment may include receiving competitive pricing bids from multiple requestors. To facilitate the bidding process, requestors are preferably notified of all competitive pricing bids and allowed to make responsive bids. The competitive pricing bids can be processed according to a broadband bandwidth allocation pricing trend. For example, bids of increasing value may be accepted if the pricing trend is up and bids of decreasing value may be accepted if the pricing trend is down. An indication of the pricing trend can be provided to the requestor. This can be part of a marketing stratagem wherein bandwidth availability is marketed more aggressively when the pricing trend is down than when the pricing trend is up. It also enables a network provider to more efficiently fill available bandwidth using attractive pricing offers.

As an additional pricing option, bandwidth can be made available by advertising rates at which units of bandwidth are available for selected periods of time. In particular, a bandwidth rate can be offered on the basis of "x" dollars per "y" megabits/second of bandwidth per "z" period of time. By way of example, a service provider could provide a short term bandwidth rate of $2 per megabit/second of bandwidth per day or a more favorable longer term rate of $30 per megabit/second of bandwidth per month.

Broadband bandwidth allocation adjustment may include adjusting one or more of the requestor's broadband bit rate, with all other broadband traffic parameters remaining the same. Alternatively, adjustments may also be made to broadband service class, broadband connection traffic descriptors, and broadband quality of service parameters. Adjustment of the broadband bit rate may include adjusting the requestor's fractional bandwidth occupancy relative to maximum available bandwidth. Adjustment of the broadband service class may include adjusting the service class to one of a Constant Bit Rate service, real-time Variable Bit Rate service, non-real-time Variable Bit Rate service, Available Bit Rate service, and Unspecified Bit Rate service. Adjustment of the broadband connection traffic descriptors may include adjusting one or more of a Peak Cell Rate value, a Sustainable Cell Rate value, a Minimum Cell Rate value, a Maximum Burst Size value, a Cell Delay Variation Tolerance value, and a Usage Parameter Control value. Adjustment of the broadband quality of service parameters may include adjusting one or more of a Cell Loss Ratio value, a Cell Transfer Delay value, and a Cell Delay Variation value.

The requestor may be a human broadband network subscriber communicating with the broadband network via a data processing device or an automated broadband allocation adjustment agent operating on a broadband network subscriber's data processing device. The agent could be adapted to initiate a broadband bandwidth allocation adjustment request based on factors relating to the subscriber's network usage. Such factors could include a comparison of the subscriber's broadband bandwidth allocation needs versus the subscriber's current broadband bandwidth allocation, and consideration of broadband bandwidth allocation pricing.

The bandwidth allocation service manager preferably provides an indication of bandwidth allocation adjustment service availability to the requester. This may include implementing a broadband bandwidth allocation adjustment website that presents a bandwidth allocation adjustment menu containing one or more selectable bandwidth allocation adjustment options. The bandwidth allocation adjustment menu could thus include a bandwidth allocation control element. The bandwidth allocation adjustment menu could also include a time duration control element for specifying a time duration for which the bandwidth allocation adjustment will remain in effect. The bandwidth allocation adjustment menu could further include a start time control element for specifying a time at which the bandwidth allocation adjustment will begin. The bandwidth allocation adjustment menu could further include a cost display element for specifying a cost of implementing the bandwidth allocation adjustment. The bandwidth allocation adjustment menu could further include a main menu containing a bandwidth allocation control element, a time duration control element, a start time control element, a cost display element, and a selection element for accessing a sub-menu containing additional bandwidth allocation control elements. The additional bandwidth allocation control elements could include one or more service category control elements, connection traffic descriptor control elements, and quality-of-service control elements.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
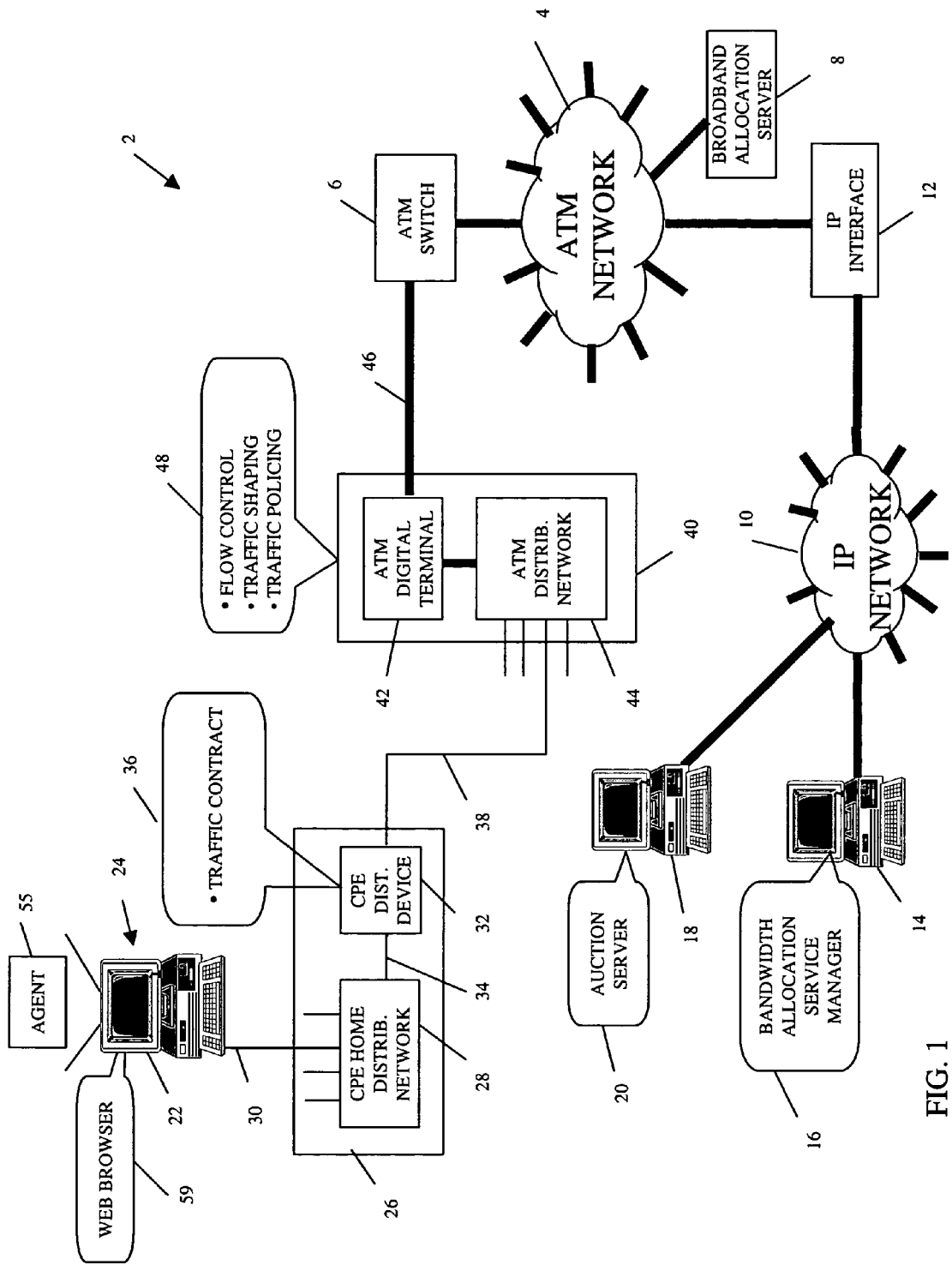
FIG. 1 is a functional block diagram showing an exemplary network topology for providing controlled broadband access to broadband network subscribers in accordance with the invention.

Turning now to the figures, wherein like reference numerals represent like elements in all of the several views, FIG. 1 illustrates an exemplary network topology 2 for providing controlled broadband access to broadband network subscribers in accordance with the invention. The topology 2 includes an ATM network 4 comprised of the usual switching, network management and server resources. Of interest among these network elements are an ATM switch 6 and a broadband allocation server 8, whose function is described in more detail below. The topology 2 further includes an IP network 10 network that communicates with the ATM network 4 through a conventional IP interface 12. The IP network 10 could be a private IP local-area or wide-area network, or the public Internet. This network includes a first data processing host 14 running a broadband bandwidth allocation service manager 16, and may also include a second data processing host 18 running an auction server 20.

A data processing device 22, such as a personal computer, is configured with hardware and software that allow it to function as a subscriber-controlled ATM end system 24 on behalf of an ATM subscriber. The ATM end system 24 can be connected to the ATM network 4 according to the generic reference architecture described in the "Residential Broadband Architecture Framework" of the ATM Forum Technical Committee (July, 1998). In particular, an FTTH (Fiber-To-The-Home) optical network access system may be used for providing high speed fiber optic connectivity to a customer premises location (such as a home, a business or the like) that implements the ATM end system 24. In this configuration, the ATM end system 24 connects to a home ATM network 26 that may include a CPE (Customer Premises Equipment) home distribution network 28 and a CPE distribution device 32.

The CPE home distribution network 28 transports ATM traffic as electrical and/or optical signals to and from the ATM end system 24. Any suitable transmission medium may be used to provide a link 30 between these elements. The CPE home distribution network 28 is also electrically and/or optically linked at 34 to a CPE distribution device 32 (described below) via a suitable transmission medium. The CPE home distribution network 28 may implement a single point-to-point connection between the ATM end system 24 and the CPE distribution device 32. Alternatively, if other ATM end systems (not shown) are present, the CPE home distribution network 28 could implement a star configuration or any other suitable topology to provide the required connections.

The CPE distribution device 32 provides a fiber optic physical layer termination to the home ATM network 26 and may also contain MAC (Media Access Controller) and ATM layer functionality. Relative to the latter, the CPE distribution device 32 may support ATM virtual connections to the ATM end system 24. It may perform ATM segmentation/reassembly and implement UNI (User Network Interface) functions such as traffic contract negotiation and maintenance, as shown at 36. This includes the ability to process and negotiate ATM service categories, traffic contracts and QoS objectives on behalf of the ATM end system 24. If there is more than one ATM end system associated with the home ATM network 26, the CPE distribution device 32 can also perform switching and/or concentration of ATM virtual connections to the ATM end systems.

In a preferred embodiment of the invention, the home ATM network 26 connects via a distribution link 38 (using any suitable transmission medium) to an ATM access network 40. The link 38 is preferably optical in nature and capable of carrying OC-3 (Optical Carrier-3) level traffic at bit rates of up to 155.52 Mbps. The ATM access network 40 may include an ATM digital terminal 42 and an ATM distribution network 44. The ATM digital terminal is linked at 46 via a suitable transmission medium to the ATM switch 6. The link 46 is also preferably optical in nature and capable of carrying at least OC-3 (Optical Carrier-3) level traffic at bit rates of up to 155.52 Mbps. As shown in FIG. 1, the ATM distribution network 44 also typically connects to other ATM home networks (not shown). The ATM access network 40 may thus serve as an ATM access concentrator relative to traffic moving in the upstream direction from multiple ATM end systems to the ATM network 4, and as an ATM demultiplexer relative to traffic moving in the downstream direction.

In addition to implementing the necessary physical layer functions to perform the optical-to-electrical and electrical-to-optical conversions described above, the ATM access network 40 may also perform dynamic resource management relative to the link 46 at the level of ATM virtual connections, so that the link can be shared among plural ATM end systems (if present). The ATM access network 40 may thus perform MAC layer functions, including downstream addressing and upstream transmission control. It can preferably distinguish between ATM cells belonging to different VCs, as well as to different subscribers (usually VPs), and perform ATM or MAC layer concentration and/or switching. The ATM access network 40 may also have the capability to perform cell level scheduling, and to implement connection admission control functions such as flow control, traffic shaping and traffic policing on behalf of the ATM end system 24, as indicated at 48.

An exemplary system which could be used to implement the ATM access network 40 is described in U.S. Pat. No. 5,781,320 (commonly assigned with the present application) entitled "Fiber Access Architecture For Use In Telecommunication Systems" (the '320 patent). The contents of the '320 patent are hereby incorporated by this reference as if fully set forth herein. The system disclosed in the '320 patent allows multiple ATM end systems to share one or more fiber optic feeder links, as exemplified by the link 46, such that each end system sees all or a portion of the full bandwidth of the feeder link(s).

In accordance with the invention, the ATM end system 24 is initially assigned an effective bandwidth allocation that may be substantially less than the full bandwidth of the link 46. For example, the ATM end system 24 might start with a functional bandwidth allocation of 0.5–1.5 Mbps. If the ATM end system 24 subscriber requires a temporary increase in bandwidth allocation, such may be obtained by contacting the bandwidth allocation service manager 16 and requesting a broadband bandwidth allocation adjustment. In this mode of operation, the ATM end system 24 becomes a bandwidth allocation "requestor."

Figure 2:
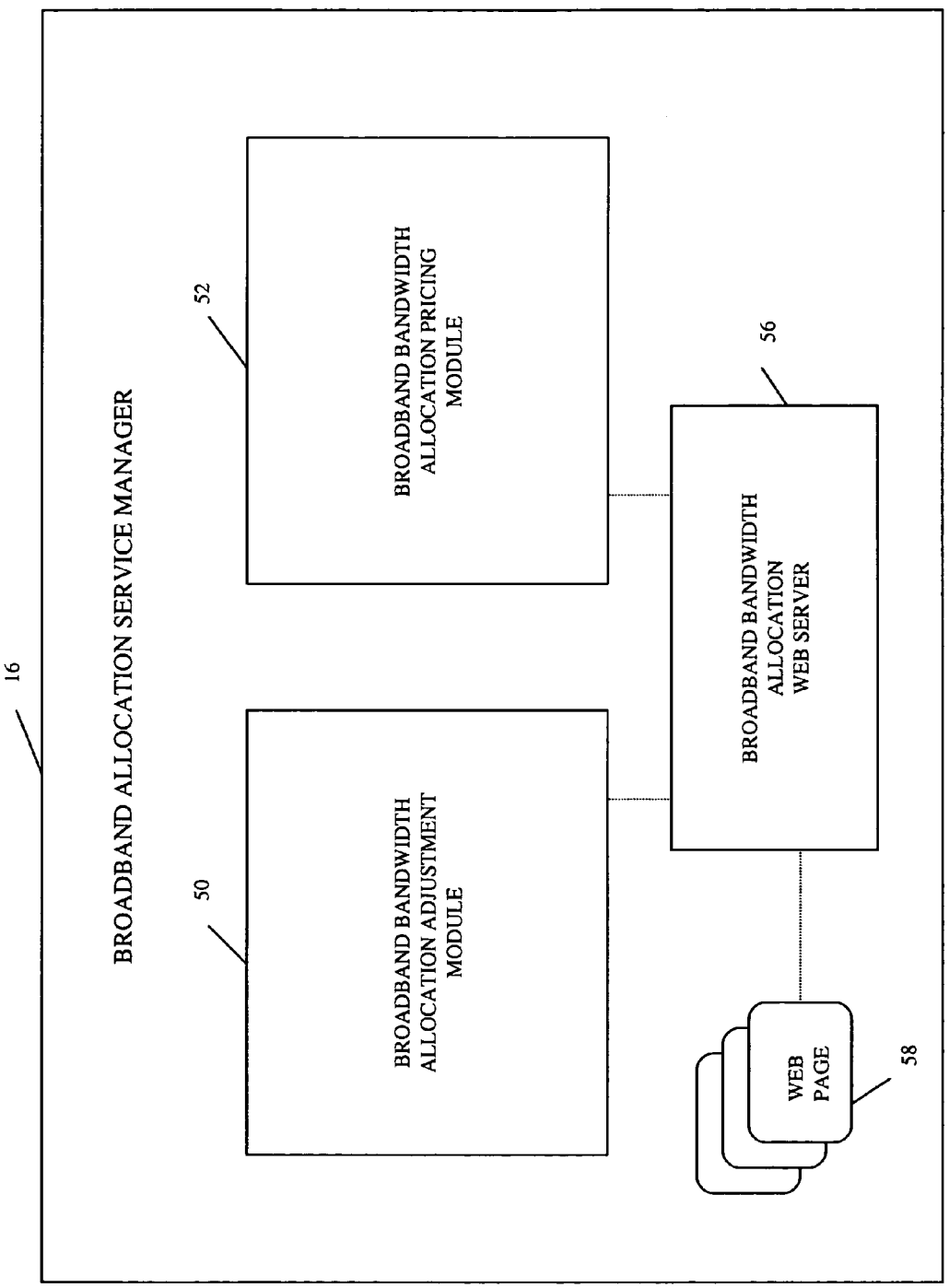
FIG. 2 is a functional block diagram showing a broadband bandwidth allocation service manager in accordance with the invention.

Turning now to FIG. 2, the bandwidth allocation service manager 16, which is preferably implemented in software, functionally includes a broadband bandwidth allocation adjustment module 50 and a broadband bandwidth allocation pricing module 52. Although the modules 50 and 52 are shown as being functionally distinct, persons skilled in the software programming art will appreciate that they could be part of a single executable programming entity. The allocation adjustment module 50 is programmed to respond to a broadband allocation adjustment request by determining whether the requested bandwidth allocation is available and if so, to grant the request. Determination of whether the requested bandwidth allocation is available can be made by querying the broadband allocation server 8, which conventionally maintains information about the available bandwidth capacity of components within the network topology 2. Granting of a broadband bandwidth allocation adjustment request can be implemented by issuing a bandwidth allocation request to components in the network topology 2 that control the broadband bandwidth that is allocated to the ATM end system 24. As described above, this may include the ATM access network 40 as well as the home ATM network 26. A third function of the allocation adjustment module 50 is to condition acceptance of a bandwidth allocation adjustment request on requester acceptance of bandwidth allocation pricing, as set by the pricing module 52 in a manner now to be described.

The pricing module 52 maintains real-time or near real-time control over broadband bandwidth allocation pricing by periodically updating bandwidth allocation pricing based on current broadband bandwidth demand and availability factors. Thus, pricing will tend to move upwardly during busy hours and downwardly during off-peak hours. The pricing module 52 can also be adapted to implement special pricing regimes, such as volume discounts, package discount deals, holiday specials, or the like.

As indicated by way of summary above, bandwidth can also be made available by advertising rates at which units of bandwidth are available for selected periods of time. In preferred embodiments, a bandwidth rate is offered on the basis of "x" dollars per "y" megabits/second of bandwidth per "z" period of time. By way of example, a service provider could provide a short term bandwidth rate of $2 per megabit/second of bandwidth per day or a more favorable longer term rate of $30 per megabit/second of bandwidth per month. Rates for other time periods, from as little as an hour to as much as six months or more, could also be made available. To determine the cost of a bandwidth allocation request, the requester need only select the desired time period, and multiply the bandwidth rate for that time period by the number of bandwidth units (e.g., the number of megabits/second) required.

Price establishment may also include receiving competitive pricing bids from multiple requestors, and awarding bandwidth allocations to qualifying bidders. This function may be implemented within the pricing module 52, or may be delegated to a dedicated bidding entity, such as the auction server 20, described in more detail below.

To facilitate the bidding process, requestors can be notified of the competitive bids of others and allowed to make responsive bids. The acceptance of bids can be based on a prevailing broadband bandwidth allocation pricing trend. For example, bids of increasing value may be accepted if the pricing trend is up, whereas bids of decreasing value may be accepted if the pricing trend is down. To guide requestor bidding, an indication of the prevailing pricing trend is preferably provided to the requestor. This allows requestors to gauge the timing and amount of their bids according to market movements. If desired, the provision of pricing trend information to requestors can be incorporated as a part of a marketing stratagem wherein, by way of example, bandwidth availability is marketed more aggressively when a pricing trend is down than when a pricing trend is up.

Broadband bandwidth allocation adjustments implemented by the bandwidth allocation adjustment module 50 may include adjusting nothing more than a requestor's broadband bit rate, with all other broadband traffic parameters remaining the same. Alternatively, adjustments may also be made to broadband service class, broadband connection traffic descriptors, and broadband quality of service parameters. Adjustment of the broadband bit rate may include adjusting the requestor's fractional bandwidth occupancy relative to maximum available bandwidth. Adjustment of the broadband service class may include adjusting the service class to one of a Constant Bit Rate (CBR) service, real-time Variable Bit Rate (rt-VBR) service, non-real-time Variable Bit Rate (nrt-VBR) service, Available Bit Rate (ABR) service, and Unspecified Bit Rate (UBR) service. Adjustment of the broadband connection traffic descriptors may include adjusting one or more of a Peak Cell Rate (PCR) value, a Sustainable Cell Rate (SCR) value, a Minimum Cell Rate (MCR) value, a Maximum Burst Size (MBR) value, a Cell Delay Variation Tolerance (CDVT) value, and a Usage Parameter Control (UPC) value. Adjustment of the broadband quality of service parameters may include adjusting one or more of a Cell Loss Ratio (CLR) value, a Cell Transfer Delay (CTD) value, and a Cell Delay Variation (CDV) value.

Contact with the bandwidth allocation service manager 16 may be initiated in two ways. First, an automated broadband bandwidth allocation adjustment agent, as shown by reference numeral 55 in FIG. 1, could operate as a background software program on a broadband network subscriber's data processing device. The agent 55 could be adapted to initiate a broadband bandwidth allocation adjustment request based on factors relating to the subscriber's network usage. Such factors might include a comparison of the subscriber's broadband bandwidth allocation needs versus the subscriber's current broadband bandwidth allocation, consideration of broadband bandwidth allocation pricing, and pre-programmed information relating to the subscriber's tolerance of slow network speed versus their willingness to pay for increased bandwidth allocation. If conditions suggesting the desirability of a bandwidth allocation increase were present, the agent 55 could negotiate for such with the bandwidth allocation service manager 16 on an automatic basis, without subscriber involvement. Alternatively, the agent 55 could be implemented to prompt the subscriber for authorization at any time during the bandwidth allocation adjustment process.

A second way to initiate contact with the bandwidth allocation service manager 16 is by way of the (human) broadband network subscriber. In that case, the bandwidth allocation server 16 can implement a bandwidth allocation web server program, as shown by reference numeral 56 in FIG. 2. The bandwidth allocation web server 56 provides a graphical user interface for subscriber interaction using one or more broadband bandwidth allocation adjustment menu web pages 58. In this embodiment, the bandwidth allocation adjustment module 50 and the bandwidth allocation pricing module 52 may be implemented, by way of example only, as a single or plural CGI (Common Gateway Interface) scripts (written in any suitable computer language) that are called by the web server 56 in response to requestor interaction with the web pages 58. As is conventionally known, this interaction is performed with the assistance of a web browser running on the requestor's data processing device, such as the web browser 59 shown in FIG. 1.

Figure 3:
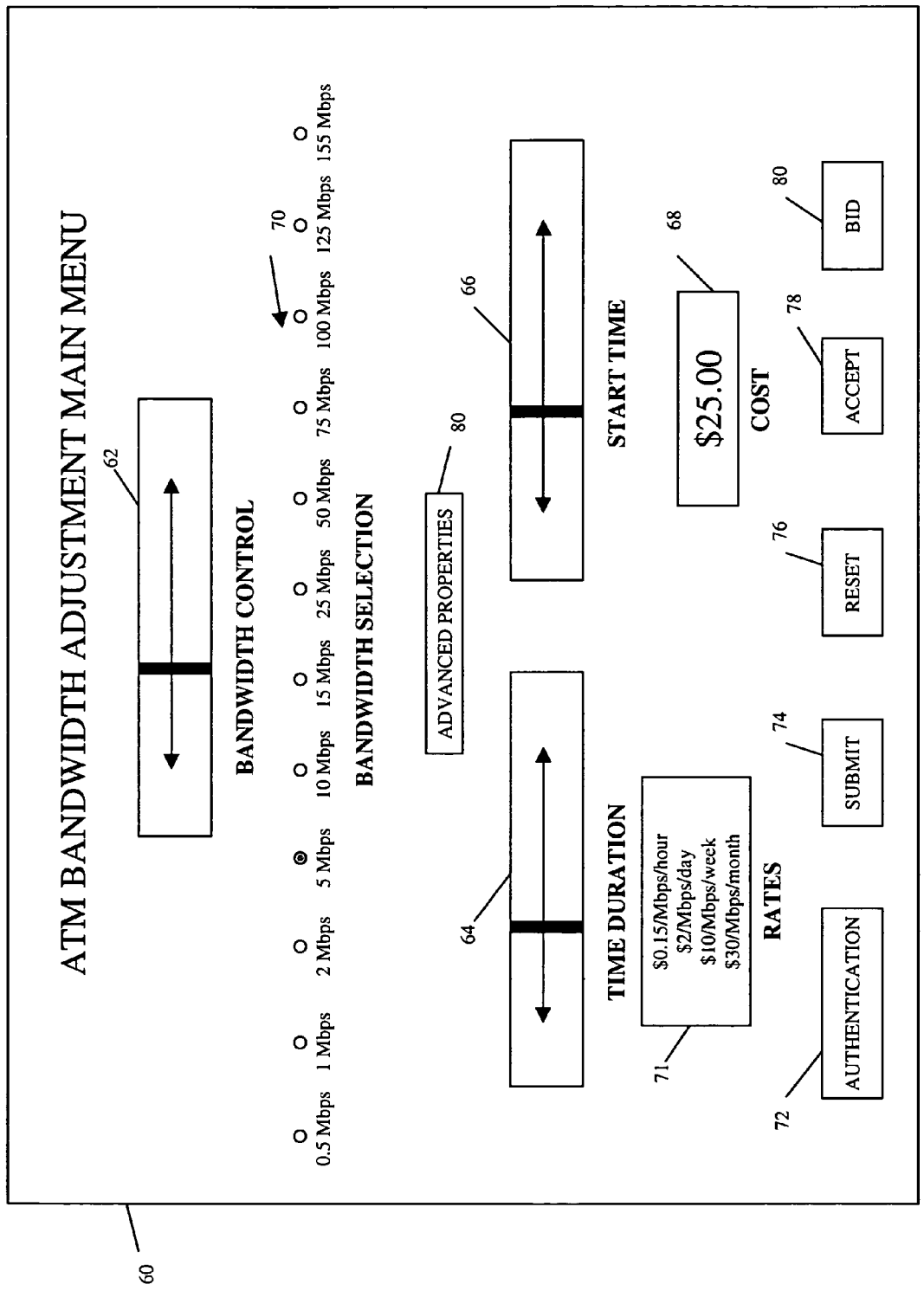
FIG. 3 is a diagrammatic illustration of a first graphical user interface for controlling broadband access bandwidth on behalf of broadband network subscribers.

FIG. 3 illustrates an exemplary one of the web pages 58 that is implemented by the bandwidth allocation web server 56. This web page provides a main menu 60 entitled "ATM Bandwidth Adjustment Main Menu" that includes a "Bandwidth Control" element 62 for selecting an adjusted bandwidth allocation, a "Time Duration" control element 64 for specifying a time duration for which a bandwidth allocation adjustment request will remain in effect, a "Start Time" control element 66 for selecting a start time for a bandwidth allocation adjustment to take effect, and a "Cost" display element 68 (Cost Window) that displays a cost of implementing a bandwidth allocation adjustment request. The control elements 62, 64 and 66 may be implemented as conventional graphical user interface "slider" elements. The Cost Window 68 may be implemented as a conventional graphical user interface numeric display element. In addition to the "Bandwidth Control" element 62, bandwidth allocation adjustments can also be selected using supplementary "Bandwidth Selection" elements 70, which may be implemented as conventional graphical user interface "radio button" elements.

An additional "Rate" display element 71 can be provided so that requesters can determine the cost of a unit of bandwidth for selected time periods, as previously described. For example, the element 71 shows unit pricing rates for one megabit/second of bandwidth for periods of one hour, one day, one week, and one month. Based on these posted rates, the requester can determine the most attractive time period to request. Moreover, unit pricing, if posted on the public web pages of multiple service providers, can provide an easy way for requesters to comparison shop for bandwidth before subscribing with a particular service provider. In addition, if switching between service providers can be made relatively easy to implement, subscribers could switch between service providers in response to price fluctuations as easily as they change brands of other services, such as local and long distance telephone service.

The main menu 60 preferably also includes five graphical user interface "pushbutton" elements 72, 74, 76, 78 and 80. Activation of pushbutton elements 72, 74, 78 and 80 by a subscriber results in a corresponding network communication being sent from the web browser 59 to the bandwidth allocation web server 56, which is programmed to take responsive action (described in more detail below). Activation of the pushbutton element 76 results in the web browser 50 performing a local "Reset" action, as further described below.

The element 72 is an "Authentication" pushbutton that a subscriber selects in order to access a linked authentication web page (not shown), which is preferably hosted by the bandwidth allocation web server 56. The authentication web page can be used to verify subscriber identify before bandwidth allocation adjustments will be allowed. For example, the control elements 62–66 and 70 could be disabled until successful authentication is performed.

The element 74 is a "Submit" pushbutton that a subscriber selects to submit a bandwidth allocation adjustment request in order to receive current pricing information. When this the Submit element 74 is selected by a subscriber, the web browser 59 sends a network communication to the bandwidth allocation web server 56 that contains a bandwidth allocation adjustment request from the subscriber. Incorporated in this bandwidth allocation adjustment request are the bandwidth allocation adjustment settings selected by the subscriber via the control elements 62 (or 70), 64 and 66. Additional bandwidth allocation information may also be sent in this network communication as a result of the subscriber filling out a submenu containing advanced bandwidth allocation properties, as described in more below. The bandwidth allocation request information is evaluated by the bandwidth allocation adjustment module 50 to determine whether the requested bandwidth is available, and then by the bandwidth allocation pricing module 52 to determine current pricing for the requested bandwidth allocation. The pricing information returned in response to activation of the Submit element 74 will be displayed in the Cost Window 68.

The element 76 is a "Reset" pushbutton that a subscriber selects to reset the menu 60 to default bandwidth allocation settings. When this pushbutton is selected by a subscriber, the web browser 50 performs a local action of resetting all of the control elements of the main menu 60 to their original settings.

The element 78 is an "Accept" pushbutton. A subscriber selects this element if he or she is satisfied with the pricing information displayed in the Cost Window 68 and wishes to implement a bandwidth allocation adjustment. Activation of the "Accept" element 78 causes the bandwidth allocation adjustment module 50 to implement a bandwidth allocation adjustment according to the selections made by the subscriber.

The element 80 is a "Bid" pushbutton that a subscriber selects to go to a bidding web page (described below) to bid for bandwidth. The bidding web page can be implemented by the bandwidth allocation web server 56, or by the auction server 20.

Figure 4:
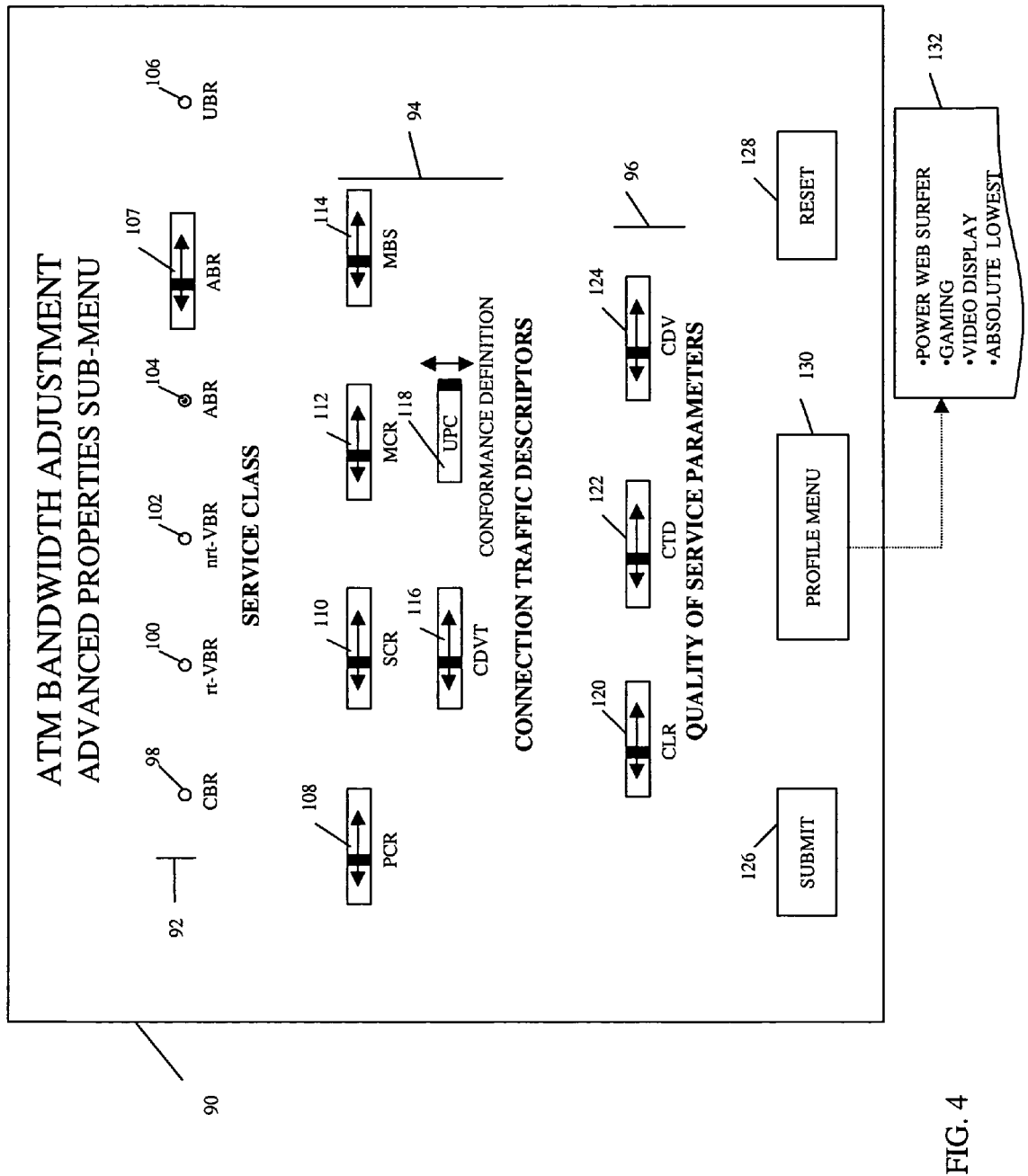
FIG. 4 is a diagrammatic illustration of a second graphical user interface for controlling broadband access bandwidth on behalf of broadband network subscribers.

The main menu 60 may further include an "Advanced Properties" selection element 82. This selection element, which may be implemented as a conventional graphical user interface pushbutton, links to a sub-menu 90 entitled "ATM Bandwidth Adjustment Advanced Properties Sub-Menu," and shown in FIG. 4. The submenu 90 contains one or more additional bandwidth allocation control elements that are specific to the broadband network serving the subscriber. For the ATM network 4, the submenu 90 may be configured with (1) five service class control elements 92 that allow a subscriber to change service class, (2) six connection traffic descriptor control elements 94 that allow a subscriber to specify cell rate parameters, a cell delay variation tolerance parameter, and a conformance definition (see below), and (3) three quality-of-service control elements 96 that allow a subscriber to set the connection quality of service parameters.

The service class control elements 92 include five graphical user interface radio buttons, each of which corresponds to an ATM service class. Thus, there is a "CBR" control button 98, an "rt-VBR" control button 100, an "nrt-VBR" control button 102, an "ABR" control button 104, and a "UBR" control button 106. For data communication, the default service class will normally be ABR. However, a subscriber or automated agent may wish to select a higher level of service (e.g., CBR) for real-time communication activities such as video conferencing. Associated with the "ABR" control button 104 is a slider control element 107 that allows adjustment of the subscriber's allocated ABR bandwidth (Minimum Cell Rate or MCR) as a percentage of the total bandwidth potentially available to all ABR subscribers.

The connection traffic descriptor control elements 94 include five graphical user interface slider switches and one graphical user interface spin dial. The slider switches include a "PCR" (Peak Cell Rate) control element 108, an "SCR" (Sustainable Cell Rate) control element 110, an "MCR" (Minimum Cell Rate) control element 112, an "MBS (Maximum Burst Size) control element 114, a "CDVT" (Cell Delay Variation Tolerance) control element 116, and a "UPC" (Usage Parameter Control) control element 118. The latter allows the subscriber to specify the traffic conformance definition that will be used by traffic policing mechanisms implemented at the subscriber's point of ingress to the ATM network 4. For the ATM end system 24, traffic policing will typically be implemented in the ATM access network 40, as previously indicated.

The quality of service control elements 96 include a "CLR" (Cell Loss Ratio) control element 122, a "CTD" (Cell Transfer Delay) control element 124, and a "CDV" (Cell Delay Variation) control element 124.

The submenu 90 further includes an "Submit" pushbutton 126 and a "Reset" pushbutton 128. The "Submit" pushbutton 126 causes the parameter selections to be submitted for price evaluation to the bandwidth allocation web server 56. Control is then returned to the main menu 60 with the parameters selected by the foregoing control element groups 92, 94 and 96 being set, and the pricing of the requested bandwidth allocation being shown in the Cost window 68. Additionally, the "Submit" element 126 may be linked to an expert help agent (not shown) that evaluates the subscriber's parameter selections and advises of any inconsistent or illegal settings. If the expert refuses the subscriber's settings, the "Reset" pushbutton 128 may be used to reset the parameter values of the submenu 90 to their default state.

As an additional feature of the submenu 90, the subscriber could be given the opportunity to select from a number of preset service profiles that are identified according to the type of service such profiles can offer the subscriber. A "Profile Menu" selection element 130 may be used for this purpose. Selection of the "Profile Menu" element 130 causes a profile menu 132 to be displayed to the subscriber. The profile menu 132 may contain any number of profiles including but not limited to, (1) "Power Web Surfing," (2) "Gaming," (3) "Video Display," (4) "Absolute Lowest Cost Bandwidth," (5) "File Transfer," (6) "Telephony," and others.

Figure 5:
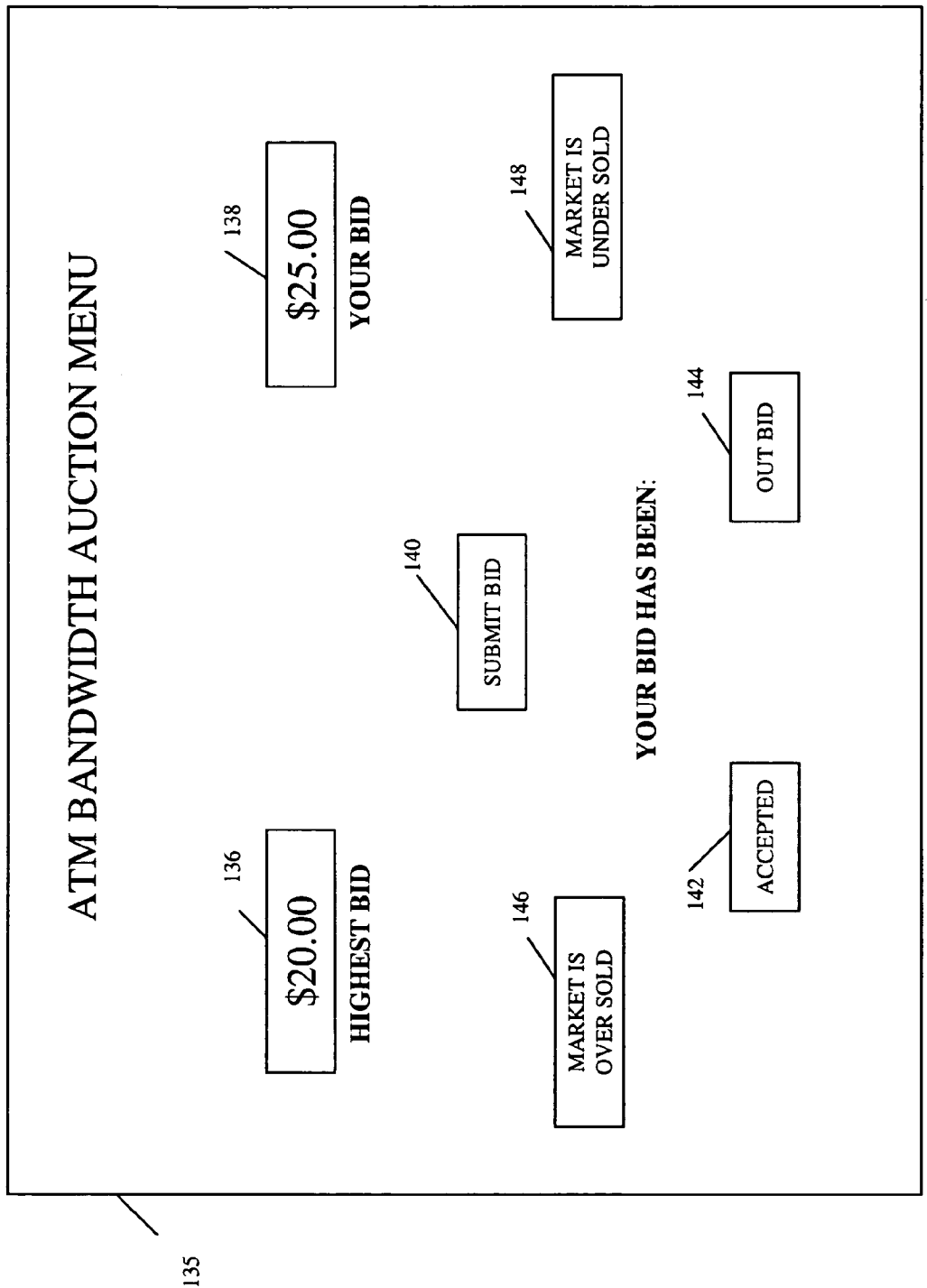
FIG. 5 is a diagrammatic illustration of a third graphical user interface for controlling broadband access bandwidth on behalf of broadband network subscribers.

Turning now to FIG. 5, an auction menu 135 is shown that may be run as a web page on the bandwidth allocation web server 56 or the auction server 20. This web page is linked to the "Bid" pushbutton 78 of FIG. 3. It allows a subscriber to bid for available bandwidth against other subscribers in the ATM network 4. A display element 136 shows the current highest bid for a bandwidth allocation request that the subscriber has entered via the main menu 60 or the sub-menu 90. A text entry field 138 allows the subscriber to enter a bid that challenges the bid shown in the display element 136. A pushbutton element 140 allows the subscriber to submit the bid shown in the text field element 138. If the subscriber's bid is accepted, notice to that effect is provided via a display element 142. If the subscriber has been outbid, the subscriber is so notified via a display element 144.

It will be appreciated that competitive biding for peak usage timeslots will tend to produce upwardly escalating bandwidth allocation costs. On the other hand, low usage timeslot bidding may result in lower bandwidth allocation costs, particularly if the bandwidth allocation adjustment start time is approaching and network bandwidth has not been fully "sold." In that case, the subscriber may find himself or herself bidding against the network service provider that operates the ATM network 4. This is analogous to airline ticket pricing wherein the cost of tickets for non-fully booked flights tends to decrease as flight time approaches in order to fill vacant seats. Note that these price movements will also be reflected in the cost display element 68 of FIG. 2, even if bandwidth bidding is not used. Preferably, one or more indicators are provided in the auction menu 135, the main menu 90, or both. Two such indicators 146 and 148 are shown in the auction menu 135. The indicator 146 indicates a bandwidth oversold condition and an upward pricing trend, and the indicator 148 indicates a bandwidth undersold condition and a downward pricing trend. One of these indicators will typically be highlighted at any given time to indicate the prevailing bandwidth market conditions.

Figure 6:
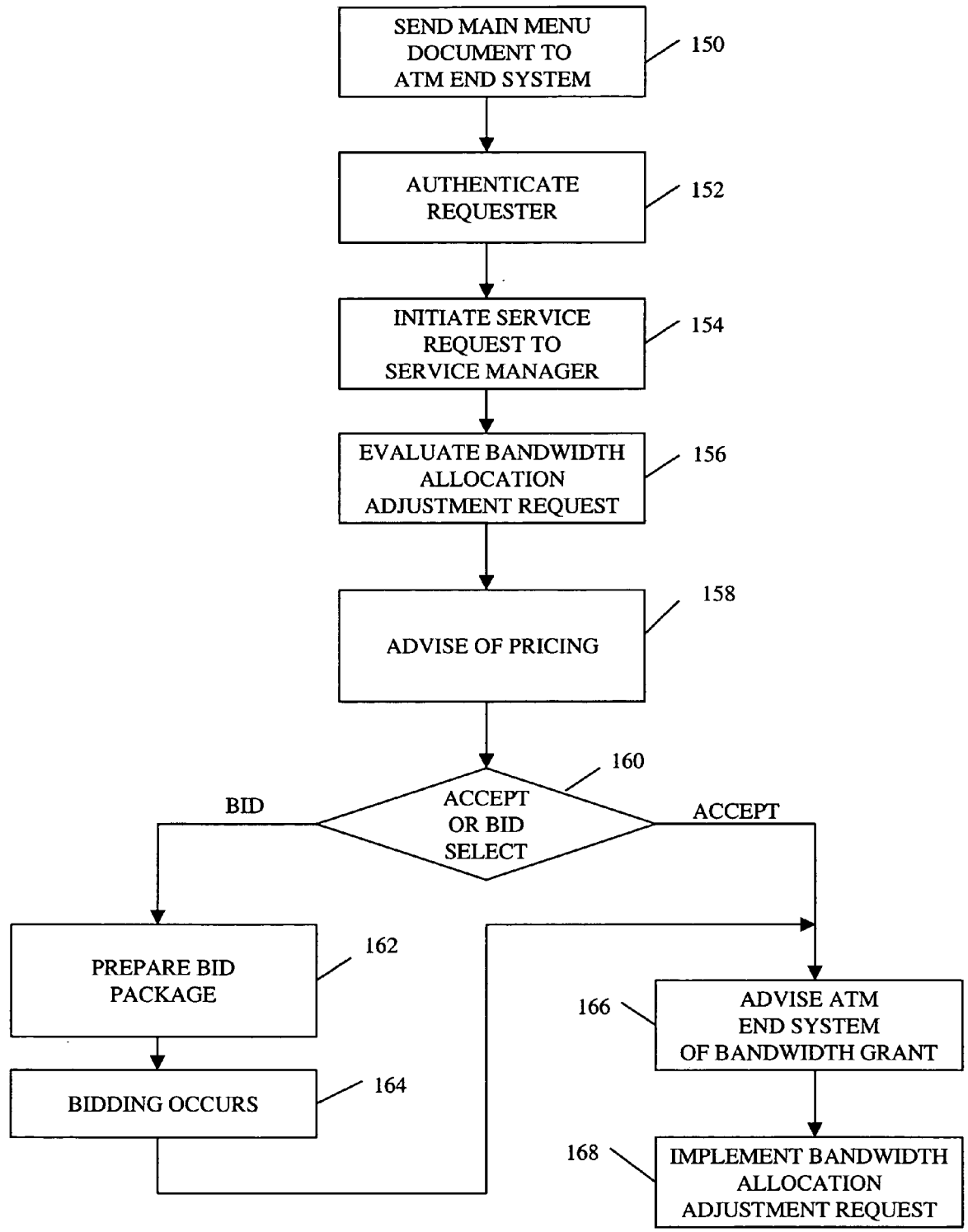
FIG. 6 is a flow diagram illustrating method steps for controlling broadband access bandwidth on behalf of broadband network subscribers.

Turning now to FIG. 6, a series of method steps are shown as an example of bandwidth allocation negotiation between the bandwidth allocation service manager 16 and either an automated agent or a subscriber associated with the ATM end system 24. In step 150, the automated agent or the subscriber initiates a service request to the bandwidth allocation service manager 16. For subscriber-initiated contact, the service request will begin with the subscriber's web browser 59 opening an HTTP (HyperText Transfer Protocol) connection to the bandwidth allocation web server 56, and the latter returning a web page 58 containing the main menu 90. In step 152, the bandwidth allocation service manager 16 authenticates the requestor. For subscriber-initiated contact, the subscriber may initiate authentication by selecting the authentication element 72 in the main menu 60. Alternatively, the bandwidth allocation web server 56 may initiate authentication.

In step 154, the requestor submits a bandwidth allocation adjustment request to the bandwidth allocation service manager 16. For subscriber-initiated contact, this step includes the subscriber filling in the desired bandwidth allocation information using the main menu 60 or the submenu 90, and selecting the "Submit" pushbutton 74. In step 156, the bandwidth allocation adjustment module 50 evaluates the bandwidth allocation adjustment request. It queries the bandwidth allocation server 8 to determine if the ATM network 4 can deliver the requested bandwidth allocation adjustment. If the ATM network 4 has capacity to satisfy the bandwidth allocation adjustment request, the bandwidth allocation pricing module is given the bandwidth allocation selection information and asked to determine a current price. In step 158, the pricing information is returned to the requester. For subscriber-initiated contact, this step includes displaying the pricing information in the Cost Window 68.

In step 160, the bandwidth allocation service manager 16 tests whether the requester wishes to accept the bandwidth allocation pricing, or be placed in a bidding environment. For subscriber-initiated contact, the bandwidth allocation web server 56 waits for the subscriber to select either the "Accept" pushbutton 78 of the "Bid" pushbutton 80 in the main menu 60. If bidding is elected, the bandwidth allocation request information is evaluated by the bandwidth allocation pricing module 52 and a bid package is created in step 162. Then in step 164, the bid package is offered up for bidding and auction processing is performed. As previously indicated, the bidding process can be managed by the bandwidth allocation pricing module 52 or can be delegated to the auction server 20.

For subscriber-initiated contact, selection of the "Bid" element 80 in the main menu 60 causes the auction menu 5 to be displayed. Following successful bidding by the subscriber in step 164, or pricing acceptance without bidding was detected in step 160, the bandwidth allocation service manager 16 notifies the requester of the bandwidth allocation grant in step 166. The bandwidth allocation request is then implemented in step 168 by the bandwidth allocation adjustment module 50. As previously indicated, this may include requesting one or more of the broadband network elements of FIG. 1 to update the traffic contract for existing virtual connections to the requestor's ATM end system, negotiate a new traffic contract for existing virtual connections to the ATM end system, or add new virtual connections to the ATM end system. Responsive accounting and billing adjustments are also made in the ATM network 4, e.g., at the bandwidth allocation server 8.

Accordingly, a system and method for providing controlled broadband access bandwidth have been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for providing controlled broadband access bandwidth allocation adjustment service in a broadband network, comprising the steps of:
   implementing a broadband bandwidth allocation service manager that is accessible via said broadband network;
   receiving a broadband bandwidth allocation adjustment request at said bandwidth allocation service manager from a broadband allocation adjustment requestor;
   adjusting a broadband bandwidth allocation on behalf of said requestor in accordance with said broadband bandwidth allocation adjustment request; and
   periodically establishing broadband bandwidth allocation pricing based on current broadband bandwidth demand and availability factors, and conditioning said adjusting step on acceptance of said bandwidth allocation pricing by said requestor.

2. A method in accordance with claim 1 wherein said step of establishing broadband bandwidth allocation pricing includes decreasing pricing to fill bandwidth allocation vacancies.

3. A method in accordance with claim 1 wherein said step of establishing broadband bandwidth allocation pricing includes providing specialized pricing to said requestor.

4. A method in accordance with claim 1 further including advertising said broadband bandwidth allocation pricing to said requestor.

5. A method in accordance with claim 4 wherein said pricing includes rates for units of bandwidth purchased for selected time periods.

6. A method in accordance with claim 1 wherein said step of establishing broadband bandwidth allocation pricing includes receiving competitive pricing bids from multiple broadband bandwidth allocation adjustment requestors.

7. A method in accordance with claim 6 further including advising said requestor of said competitive pricing bids and allowing said requestor to make responsive bids.

8. A method in accordance with claim 6 further including processing said competitive pricing bids according to a broadband bandwidth allocation pricing trend.

9. A method in accordance with claim 8 wherein said competitive processing step includes accepting bids of increasing value if said pricing trend is up and accepting bids of decreasing value if said pricing trend is down.

10. A method in accordance with claim 8 further including providing an indication to said requestor of said pricing trend.

11. A method in accordance with claim 10 wherein said pricing trend indication providing step includes marketing bandwidth availability more aggressively when said pricing trend is down than when said pricing trend is up.

12. A method in accordance with claim 1 wherein said adjusting step includes adjusting one or more of said requestor's broadband bandwidth allocation, broadband service class, broadband connection traffic descriptors, and broadband quality of service parameters.

13. A method in accordance with claim 12 wherein adjustment of said broadband bandwidth allocation includes adjusting said requestor's fractional bandwidth occupancy relative to maximum available bandwidth.

14. A method in accordance with claim 12 wherein adjustment of said broadband service class includes adjusting said bandwidth service class to one of a Constant Bit Rate service, real-time Variable Bit Rate service, non-real-time Variable Bit Rate service, Available Bit Rate service, and Unspecified Bit Rate service.

15. A method in accordance with claim 12 wherein adjustment of said broadband connection traffic descriptors includes adjusting one or more of a Peak Cell Rate value, a Sustainable Cell Rate value, a Minimum Cell Rate value, a Maximum Burst Size value, a Cell Delay Variation Tolerance value, and a Usage Parameter Control value.

16. A method in accordance with claim 12 wherein adjustment of said broadband quality of service parameters includes adjusting one or more of a Cell Loss Ratio value, a Cell Transfer Delay value, and a Cell Delay Variation value.

17. A method in accordance with claim 1 wherein said requestor is a human broadband network subscriber communicating with said broadband network via a data processing device.

18. A method in accordance with claim 1 wherein said requestor is an automated broadband allocation adjustment agent operating on a broadband network subscriber's data processing device, said agent being adapted to initiate a broadband bandwidth allocation adjustment request based on factors relating to said broadband network subscriber's use of said data processing device.

19. A method in accordance with claim 18 wherein said factors include a comparison of said subscriber's broadband bandwidth allocation needs versus said subscriber's current broadband bandwidth allocation, and consideration of broadband bandwidth allocation pricing.

20. A method in accordance with claim 1 further including the step of providing an indication to said requestor of broadband bandwidth allocation adjustment service availability.

21. A method in accordance with claim 20 wherein said indication providing step includes implementing a broadband bandwidth allocation adjustment website.

22. A method in accordance with claim 1 wherein said bandwidth allocation service manager implements a bandwidth allocation adjustment menu containing one or more selectable bandwidth allocation adjustment options and said receiving step includes receiving inputs from said requestor representing selections of said one or more bandwidth allocation adjustment options.

23. A method in accordance with claim 22 wherein said bandwidth allocation adjustment menu includes a bandwidth allocation control element.

24. A method in accordance with claim 22 wherein said bandwidth allocation adjustment menu includes a time duration control element for specifying a time duration for which said bandwidth allocation adjustment will remain in effect.

25. A method in accordance with claim 22 wherein said bandwidth allocation adjustment menu includes a start time control element for specifying a time at which said bandwidth allocation adjustment will begin.

26. A method in accordance with claim 22 wherein said bandwidth allocation adjustment menu includes a cost display element for specifying a cost of implementing said bandwidth allocation adjustment.

27. A method in accordance with claim 22 wherein said bandwidth allocation adjustment menu includes a rate display element for specifying rates for units of bandwidth purchased for selected time periods.

28. A method in accordance with claim 22 wherein said bandwidth allocation adjustment menu includes a main menu containing a bandwidth allocation control element, a time duration control element, a start time control element, a cost display element, and a selection element for accessing a sub-menu containing additional bandwidth allocation control elements.

29. A method in accordance with claim 28 wherein said additional bandwidth allocation control elements include one or more service category control elements, connection traffic descriptor control elements, and quality-of-service control elements.

30. A method in accordance with claim 1 wherein, prior to said adjusting step, said broadband bandwidth allocation adjustment request is processed to determine whether said broadband network can provide the requested bandwidth allocation adjustment.

31. A system for providing controlled broadband access bandwidth allocation adjustment service in a broadband network, comprising:
a broadband bandwidth allocation service manager that is accessible via said broadband network;
a broadband bandwidth allocation adjuster associated with said service manager, said allocation adjuster being responsive to a broadband allocation adjustment request from a requestor; and
a broadband bandwidth allocation pricer that is responsive to broadband bandwidth demand and availability factors, said pricer being linked to said allocation adjuster, and said allocation adjuster being responsive to acceptance of bandwidth allocation pricing set by said bandwidth allocation pricer by said requestor.

32. A system in accordance with claim 31 wherein said broadband bandwidth allocation pricer is adapted to decrease pricing to fill bandwidth allocation vacancies.

33. A system in accordance with claim 31 wherein said broadband bandwidth allocation pricer is adapted to provide specialized pricing to said requestor.

34. A system in accordance with claim 31 wherein said broadband bandwidth allocation pricer is adapted to advertise broadband bandwidth allocation pricing to said requestor.

35. A system in accordance with claim 34 wherein said pricing includes rates for units of bandwidth purchased for selected time periods.

36. A system in accordance with claim 31 wherein said bandwidth allocation pricer includes an auction module that is responsive to competitive pricing bids from multiple broadband bandwidth allocation adjustment requestors.

37. A system in accordance with claim 31 wherein said auction module is adapted to advise said requestor of said competitive pricing bids and allow said requestor to make responsive bids.

38. A system in accordance with claim 31 wherein said auction module is further adapted to processing said competitive pricing bids according to a broadband bandwidth allocation pricing trend.

39. A system in accordance with claim 38 wherein said auction module is adapted to accept bids of increasing value if said pricing trend is up and accepting bids of decreasing value if said pricing trend is down.

40. A system in accordance with claim 38 wherein said auction module is adapted to provide an indication to said requestor of said pricing trend.

41. A system in accordance with claim 40 wherein said auction module is adapted to market bandwidth availability more aggressively when said pricing trend is down than when said pricing trend is up.

42. A system in accordance with claim 31 wherein said allocation adjuster is adapted to adjust one or more of said requestor's broadband bandwidth allocation, broadband service class, broadband connection traffic descriptors, and broadband quality of service parameters.

43. A system in accordance with claim 42 wherein said allocation adjuster is adapted to adjust said requestor's fractional bandwidth occupancy relative to maximum available bandwidth.

44. A system in accordance with claim 42 wherein said allocation adjuster is adapted to adjust said bandwidth service class to one of a Constant Bit Rate service, real-time Variable Bit Rate service, non-real-time Variable Bit Rate service, Available Bit Rate service, and Unspecified Bit Rate service.

45. A system in accordance with claim 42 wherein said allocation adjuster is adapted to adjust one or more of a Peak Cell Rate value, a Sustainable Cell Rate value, a Minimum Cell Rate value, a Maximum Burst Size value, a Cell Delay Variation Tolerance value, and a Usage Parameter Control value.

46. A system in accordance with claim 42 wherein said allocation adjuster is adapted to adjust one or more of a Cell Loss Ratio value, a Cell Transfer Delay value, and a Cell Delay Variation value.

47. A system in accordance with claim 31 wherein said requestor is a human broadband network subscriber communicating with said broadband network via a data processing device.

48. A system in accordance with claim 31 wherein said requestor is an automated broadband allocation adjustment agent operating on a broadband network subscriber's data processing device, said agent being adapted to initiate a broadband bandwidth allocation adjustment request based on factors relating to said broadband network subscriber's use of said data processing device.

49. A system in accordance with claim 48 wherein said factors include a comparison of said subscriber's broadband bandwidth allocation needs versus said subscriber's current broadband bandwidth allocation, and consideration of broadband bandwidth allocation pricing.

50. A system in accordance with claim 31 wherein said service manager is adapted to provide an indication to said requestor of broadband bandwidth allocation adjustment service availability.

51. A system in accordance with claim 50 wherein said service manager implements a broadband bandwidth allocation adjustment website.

52. A system in accordance with claim 31 wherein said service manager implements a bandwidth allocation adjustment menu containing one or more selectable bandwidth allocation adjustment options and responsive to inputs from said requestor representing selections of said one or more bandwidth allocation adjustment options.

53. A system in accordance with claim 52 wherein said bandwidth allocation adjustment menu includes a bandwidth allocation control element.

54. A system in accordance with claim 52 wherein said bandwidth allocation adjustment menu includes a time duration control element for specifying a time duration for which said bandwidth allocation adjustment will remain in effect.

55. A system in accordance with claim 52 wherein said bandwidth allocation adjustment menu includes a start time control element for specifying a time at which said bandwidth allocation adjustment will begin.

56. A system in accordance with claim 52 wherein said bandwidth allocation adjustment menu includes a cost display element for specifying a cost of implementing said bandwidth allocation adjustment.

57. A system in accordance with claim 52 wherein said bandwidth allocation adjustment menu includes a rate display element for specifying rates for units of bandwidth purchased for selected time periods.

58. A system in accordance with claim 52 wherein said bandwidth allocation adjustment menu includes a main menu containing a bandwidth allocation control element, a time duration control element, a start time control element, a cost display element, and a selection element for accessing a sub-menu containing additional bandwidth allocation control elements.

59. A system in accordance with claim 58 wherein said additional bandwidth allocation control elements include one or more service category control elements, connection traffic descriptor control elements, and quality-of-service control elements.

60. A system in accordance with claim 31 wherein said allocation adjuster is adapted to process said broadband bandwidth allocation adjustment request by determining whether said broadband network can provide the requested bandwidth allocation adjustment.

61. A method for providing controlled broadband access bandwidth allocation in a broadband network, comprising:

implementing a broadband bandwidth allocation server connected to the broadband network;

sending a first network communication to a subscriber end system in the broadband network that advises of one or more network bandwidth allocation adjustment options from which a subscriber may select, said first communication comprising a graphical user interface that includes a main menu comprising a bandwidth allocation control element for selecting a bandwidth allocation adjustment, a time duration control element for specifying a time duration for which said bandwidth allocation adjustment will remain in effect, and a cost display element for specifying a cost of implementing said bandwidth allocation adjustment, said main menu further including a selection element for accessing a submenu containing additional bandwidth allocation control elements, said additional bandwidth allocation control elements including one or more service category control elements, connection traffic descriptor control elements, and quality-of-service control elements;

receiving a second network communication from the subscriber end system in response to said first communication containing a bandwidth allocation request from the subscriber; and granting the subscriber end system a network bandwidth allocation adjustment that corresponds to said bandwidth allocation request, if available.

\* \* \* \* \*